US012643996B2

(12) United States Patent
Malucelli et al.

(10) Patent No.: US 12,643,996 B2
(45) Date of Patent: *Jun. 2, 2026**

(54) PROCESS FOR PRODUCING A POLYETHYLENE COMPOSITION COMPRISING BIMODAL OR MULTIMODAL POLYETHYLENE

(71) Applicant: Basell Polyolefine GmbH, Wesseling (DE)

(72) Inventors: Decio Malucelli, Ferrara (IT); Marco Consalvi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 495 days.

This patent is subject to a terminal disclaimer.

(21) Appl. No.: 18/253,126

(22) PCT Filed: Nov. 11, 2021

(86) PCT No.: PCT/EP2021/081372
§ 371 (c)(1),
(2) Date: May 16, 2023

(87) PCT Pub. No.: WO2022/101337
PCT Pub. Date: May 19, 2022

(65) Prior Publication Data
US 2024/0010822 A1     Jan. 11, 2024

(30) Foreign Application Priority Data
Nov. 16, 2020     (EP) .................................... 20207781

(51) Int. Cl.
*C08L 23/06* (2006.01)
*B29C 48/00* (2019.01)
(Continued)

(52) U.S. Cl.
CPC ............ *C08L 23/06* (2013.01); *B29C 48/022* (2019.02); *B29C 48/09* (2019.02); *B29C 48/40* (2019.02);
(Continued)

(58) Field of Classification Search
CPC ....... C08L 23/06; B29C 48/022; B29C 48/09; B29C 48/40; C08F 2/001; C08F 2/01; C08F 110/02; C08J 3/12; C08K 5/14
See application file for complete search history.

(56) References Cited

U.S. PATENT DOCUMENTS

2004/0086592 A1     5/2004   Winter et al.
2005/0234197 A1     10/2005   Goldberg et al.
(Continued)

FOREIGN PATENT DOCUMENTS

EP          0030757 A1     6/1981
EP          2966123 A1     1/2016
(Continued)

*Primary Examiner* — John E Uselding

(57) ABSTRACT

A process for preparing a polyethylene composition made from or containing bimodal or multimodal polyethylene in an extruder device including the steps of (i) mixing a bimodal or multimodal polyethylene having a density from 0.940 g/cm$^3$ to 0.968 g/cm$^3$, in the form of a polyethylene powder, with an additive, in a mixing device at a temperature from 10° C. to 100° C. without melting the polyethylene powder; (ii) melting and homogenizing the mixture within the extruder device, thereby forming a molten polyethylene composition; and (iii) pelletizing the molten polyethylene composition, and further (iv) adding a liquid made from or containing an organic peroxide, in an amount from 20 ppm to 200 ppm of organic peroxide with respect to the polyethylene powder, to the polyethylene powder at a position where mixing occurs and the polyethylene powder has a temperature of from 10° C. to 100° C.

19 Claims, 5 Drawing Sheets

(51) Int. Cl.

| | |
|---|---|
| *B29C 48/09* | (2019.01) |
| *B29C 48/40* | (2019.01) |
| *C08F 2/00* | (2006.01) |
| *C08F 2/01* | (2006.01) |
| *C08F 110/02* | (2006.01) |
| *C08J 3/12* | (2006.01) |
| *C08K 5/14* | (2006.01) |
| *B29K 23/00* | (2006.01) |
| *B29L 23/00* | (2006.01) |

(52) U.S. Cl.
CPC ................ *C08F 2/001* (2013.01); *C08F 2/01* (2013.01); *C08F 110/02* (2013.01); *C08J 3/12* (2013.01); *C08K 5/14* (2013.01); *B29K 2023/0608* (2013.01); *B29L 2023/22* (2013.01); *C08J 2323/06* (2013.01); *C08L 2203/18* (2013.01); *C08L 2314/02* (2013.01)

(56) References Cited

U.S. PATENT DOCUMENTS

| | | |
|---|---|---|
| 2019/0284315 A1 | 9/2019 | Rohatgi et al. |
| 2025/0282919 A1* | 9/2025 | Consalvi ................. C08L 23/26 |

FOREIGN PATENT DOCUMENTS

| | | |
|---|---|---|
| EP | 3450127 A1 | 3/2019 |
| JP | 2000219884 A | 8/2000 |
| WO | 9704015 A1 | 2/1997 |
| WO | 0002929 A1 | 1/2000 |
| WO | 03093363 A1 | 11/2003 |
| WO | 2010049167 A1 | 5/2010 |
| WO | 2012152775 A1 | 11/2012 |
| WO | 2013101767 A2 | 7/2013 |
| WO | 2017202802 A1 | 11/2017 |
| WO | 2018114453 A1 | 6/2018 |

* cited by examiner

PROCESS FOR PRODUCING A POLYETHYLENE COMPOSITION COMPRISING BIMODAL OR MULTIMODAL POLYETHYLENE

This application is the U.S. National Phase of PCT International Application PCT/EP2021/081372, filed Nov. 11, 2021, claiming benefit of priority to European Patent Application No. 20207781.4, filed Nov. 16, 2020, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a process for preparing a polyethylene composition made from or containing bimodal or multimodal polyethylene.

BACKGROUND OF THE INVENTION

In some instances, polyethylenes are used to prepare pipes, including pressure pipe. As used herein, the term "pressure pipe" refers to pipes designed to transport fluids at conditions having a higher pressure inside the pipe than outside the pipe. In some instances, the polyethylenes are bimodal or multimodal polyethylenes having a density from 0.940 g/cm$^3$ to 0.968 g/cm$^3$.

For pipe applications, the polyethylenes should demonstrate adequate extrusion processability and avoid sagging. As used herein, the term "sagging" refers to the effect that, during melt extrusion of the pipe, a portion of the melt flows from an upper part of the pipe to a lower part of the pipe, thereby resulting in pipe-wall-thickness variation around the pipe circumference.

SUMMARY OF THE INVENTION

In a general embodiment, the present disclosure provides a process for preparing a polyethylene composition made from or containing bimodal or multimodal polyethylene in an extruder device including the steps of a) supplying a bimodal or multimodal polyethylene, having a density determined according to DIN EN ISO 1183-1:2004 at 23° C. from 0.940 g/cm$^3$ to 0.968 g/cm$^3$, in the form of a polyethylene powder to a mixing device;

b) supplying an additive, which is not an organic peroxide, to the mixing device;

c) mixing the polyethylene powder and the additive at a temperature in the range from 10° C. to 100° C. without melting the polyethylene powder, thereby forming a mixture;

d) transferring the mixture from the mixing device into the extruder device;

e) melting and homogenizing the mixture within the extruder device, thereby forming a molten polyethylene composition; and f) pelletizing the molten polyethylene composition, and further adding a liquid made from or containing an organic peroxide to (i) the polyethylene powder or (ii) the mixture made from or containing the polyethylene powder, in an amount from 20 ppm to 200 ppm of organic peroxide with respect to the polyethylene powder, wherein the liquid is added at a position where mixing occurs and the polyethylene powder has a temperature of from 10° C. to 100° C.

In some embodiments, the liquid is added to (i) the polyethylene powder or (ii) the mixture, in the mixing device prior to or during step c).

In some embodiments, the liquid is added to the mixture in the extruder device at a position, where the mixture is not yet molten, prior to step e).

In some embodiments, the liquid is added to the polyethylene powder by passing the liquid with an injection pressure of 0.5 to 4 MPa through a spring injector having a preloaded spring.

In some embodiments, the liquid is a peroxide solution having a content of active oxygen in the range from 0.1 wt. % to 10 wt. %, based upon the total weight of the liquid.

In some embodiments, the mixing of step c) is carried out in an atmosphere of reduced oxygen content and the oxygen content in the gas phase within the mixing device is less than 5 vol %.

In some embodiments, the mixture is introduced into the extruder device in an atmosphere of reduced oxygen content and the oxygen content in the hopper is less than 5 vol %.

In some embodiments, the extruder device is a combination of a first and a second co-rotating twin-screw extruders, wherein the first twin-screw extruder melt mixes the mixture and forms a molten polymer stream and wherein the second twin-screw extruder receives the molten polymer stream from the first twin-screw extruder and completes the homogenization process.

In some embodiments, the extruder device is a counter-rotating continuous mixer equipped with gear pump or a co-rotating twin screw extruder equipped with gear pump.

In some embodiments, the specific energy applied per amount of material being processed in step e) is from 120 kWh/t to 350 kWh/t.

In some embodiments, the molten polyethylene composition is passed through a melt filter before being pelletized.

In some embodiments, the bimodal or multimodal polyethylene has a $M_w/M_n$ from 15 to 40.

In some embodiments, the polymerization for preparing the bimodal or multimodal polyethylene is carried out in the presence of a polymerization catalyst which is a Ziegler- or Ziegler-Natta-catalyst made from or containing a reaction product of an aluminum alkyl with a titanium compound supported on a magnesium halide.

In some embodiments, the present disclosure provides a process for preparing a pipe including the steps of a) preparing a polyethylene composition; and b) forming the polyethylene composition into a pipe.

DETAILED DESCRIPTION OF THE INVENTION

Figure 1:
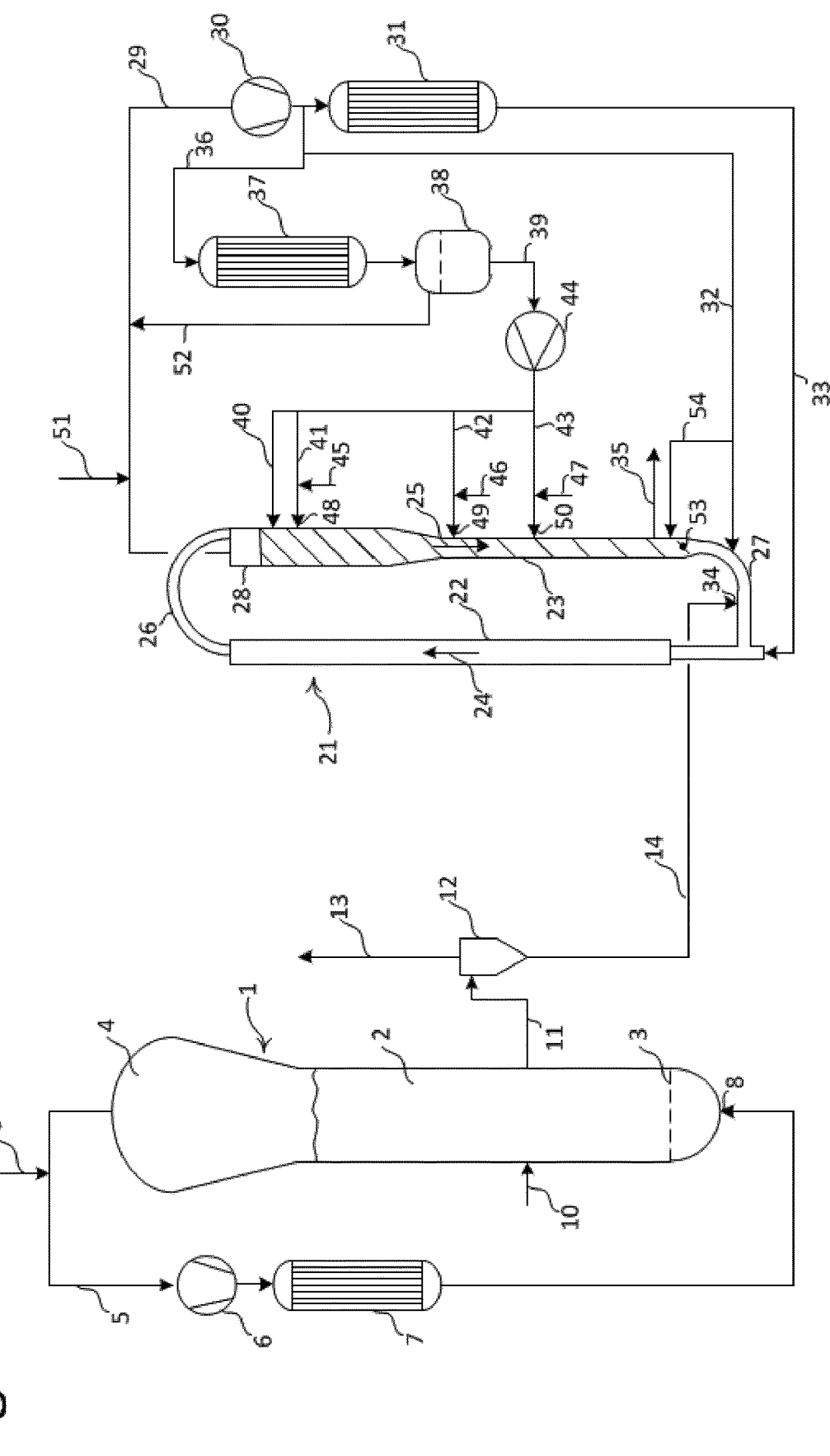
FIG. 1 shows a schematic of a reactor for preparing bimodal or multimodal polyethylenes.

In some embodiments, the present disclosure provides a process for preparing a polyethylene composition made from or containing bimodal or multimodal polyethylene. In some embodiments, the bimodal or multimodal polyethylenes is obtained by polymerizing ethylene or copolymerizing ethylene and one or more other olefins. In some embodiments, the olefins are 1-olefins. As used herein, the term "1-olefins" refers to hydrocarbons having terminal double bonds. In some embodiments, the olefins are functionalized olefinically unsaturated compounds. In some embodiments, the olefins are linear $C_3$-$C_{12}$-1-alkenes, branched $C_3$-$C_{12}$-1-alkenes, branched $C_2$-$C_{10}$-1-alkenes, conjugated dienes, or nonconjugated dienes. In some embodiments, the linear $C_3$-$C_{10}$-1-alkenes are selected from the group consisting of propylene, 1-butene, 1-pentene, 1-hexene, 1-heptene, 1-octene, and 1-decene. In some embodiments, the branched $C_2$-$C_{10}$-1-alkenes is 4-methyl-1-pentene. In some embodiment, the diene is selected from the group consisting of 1,3-butadiene, 1,4-hexadiene, and 1,7-octadiene. In some embodiments, ethylene is copolymerized with mixtures of two or more 1-olefins. In some embodiments, the olefins have the double bond as part of a cyclic structure. In some embodiments, the cyclic structure has one or more ring systems. In some embodiments, the olefins, including a cyclic structure, are selected from the group consisting of cyclopentene, norbornene, tetracyclododecene, methylnorbornene, 5-ethylidene-2-norbornene, norbornadiene, and ethylnorbornadiene In some embodiments, the process is for the homopolymerization or copolymerization of ethylene. In some embodiments, the comonomers are present in an amount up to 20 wt. %, alternatively from 0.01 wt. % to 15 wt. %, alternatively from 0.05 wt. % to 12 wt. %, of $C_3$-$C_8$-1-alkenes. In some embodiments, the alkenes are selected from the group consisting of 1-butene, 1-pentene, 1-hexene, and 1-octene. In some embodiments, ethylene is copolymerized with from 0.1 wt. % to 12 wt. % of an alkene selected from the group consisting of 1-hexene and 1-butene.

In some embodiments, the polyethylenes are bimodal or multimodal polyethylenes. As used herein, the terms "bimodal" and "multimodal" refer to the modality of the molecular weight distribution. In some embodiments, the polymers are obtained from polymerizing ethylene or copolymerizing ethylene and one or more other olefins in a series of two or more polymerization reactors under different reaction conditions. In some embodiments, the polymers are obtained by employing mixed catalyst system made from or containing two or more types of polymerization catalysts which produce, under the same polymerization conditions, polyethylenes of a different molecular weight. As used herein, the term "modality" indicates how many different polymerization conditions were utilized in preparing the polyethylene, independently of (a) whether this modality of the molecular weight distribution is recognizable as separated maxima in a gel permeation chromatography (GPC) curve or (b) how many different types of polymerization catalysts from which the mixed polymerization catalyst system is made or containing. As used herein, the term "multimodal" includes bimodal. In some embodiments, the polyethylene has the molecular weight distribution and a comonomer distribution. In some embodiments, the average comonomer content of polymer chains having a comparably higher molecular weight is higher than the average comonomer content of polymer chains with having a comparably lower molecular weight. In some embodiments, identical or similar reaction conditions in the polymerization reactors of a series of polymerization reactors, thereby preparing narrow molecular weight polyethylenes. In some embodiments and when preparing multimodal polyethylenes in a series of polymerization reactors operating at different reaction conditions, different residence times of individual polyethylene particles in different reactors yield polyethylene particles of different composition.

In some embodiments, the polymerization methods for preparing the bimodal or multimodal polyethylenes are selected from the group consisting of solution processes, suspension processes, and gas-phase processes. In some embodiments, the polymerization is carried out batchwise or continuously in two or more stages. In some embodiments, the polymerization is gas-phase polymerization, alternatively in gas-phase fluidized-bed reactors or multi-zone circulating gas-phase reactors. In some embodiments, the polymerization is suspension polymerization, alternatively in loop reactors or stirred tank reactors.

In some embodiments, the polymerizations for preparing the bimodal or multimodal polyethylenes is operated at pressures of from 0.5 MPa to 10 MPa, alternatively from 1.0 MPa to 8 MPa, alternatively from 1.5 MPa to 4 MPa. As used herein, the term "pressure" refers to absolute pressures, that is, pressure having the dimension MPa (abs). In some embodiments, the polymerizations are carried out at temperatures of from 30° C. to 160° C., alternatively from 65° C. to 125° C. In some embodiments, the temperatures are in the upper part of the range from 65° C. to 125° C. and prepare ethylene polymers of relatively high density. In some embodiments, the temperatures are in the lower part of the range from 65° C. to 125° C. and prepare ethylene copolymers of lower density.

In some embodiments, the bimodal or multimodal polyethylenes are prepared in gas-phase. In some embodiments, the bimodal or multimodal polyethylenes are prepared in a multi-zone circulating gas-phase reactor. In some embodiments, the bimodal or multimodal polyethylenes are prepared in a series of two or more gas-phase polymerization reactors, alternatively a series of two or more fluidized-bed reactors, alternatively a series including a multi-zone circulating gas-phase reactor and a gas-phase polymerization reactor. In some embodiments, the gas-phase polymerization reactor is a fluidized-bed reactor. In some embodiments, the bimodal or multimodal polyethylenes are prepared in a series of a first suspension polymerization reactor and a second gas-phase polymerization reactor. In some embodiments, the suspension reactor is a loop reactor. In some embodiments, the gas-phase polymerization reactor is a fluidized-bed reactor.

In some embodiments, the apparatus for preparing the bimodal or multimodal polyethylenes includes a gas-phase polymerization reactor having a riser unit, wherein growing polymer particles flow upwards under fluidization, fast fluidization, or transport conditions, and a downcomer, wherein the growing polymer particles flow downward in a densified form.

In some embodiments, the riser unit includes a fluidized bed of growing polymer particles. In some embodiments, the riser unit operates as a thoroughly mixed gas-phase reactor such as a fluidized bed reactor. As described herein, fluidized-bed reactors are reactors, wherein the polymerization takes place in a bed of polymer particles, and maintained in a fluidized state by feeding in a reaction gas mixture at the lower end of the reactor and taking off the gas again at the reactor's upper end. In some embodiments, feeding of the reaction gas mixture occurs below a gas distribution grid having the function of dispensing the gas flow. The reaction gas mixture is then returned to the lower end to the reactor via a recycle line equipped with a compressor and a heat exchanger for removing the heat of polymerization. In some embodiments, the velocity of the reaction gas mixture fluidizes the mixed bed of finely divided polymer present in the tube serving as polymerization zone and removes the heat of polymerization.

In some embodiments, the downcomer is positioned within, around, or adjacent to the gas-phase reactor. In some embodiments, two or more separated polymerization units are used as the downcomer.

In some embodiments, the riser unit is a riser, wherein an upward movement of growing polymer particles occurs under fast fluidization or transport conditions. Fast fluidization conditions inside the riser are established by feeding a reaction gas mixture at a velocity higher than the transport velocity of the polymer particles. In some embodiments, the velocity of the reaction gas mixture is between 0.5 and 15 m/s, alternatively between 0.8 and 5 m/s. As used herein, the terms "transport velocity" and "fast fluidization conditions" are as defined in "D. Geldart, Gas Fluidization Technology, page 155 et seq., J. Wiley & Sons Ltd., 1986".

As used herein, the part of the polymerization reactor, wherein the growing polymer particles flow downward in a densified form, is referred to interchangeably as "downcomer," "moving bed," or "settled bed" unit or reactor. As used herein, the term "densified form" refers to the ratio between the mass of polymer and the reactor volume is higher than 80% of the "poured bulk density" of the resulting polymer. For example and in terms of densified form, a polymer bulk density equal to 420 kg/m³ indicates a polymer mass/reactor volume ratio of at least 336 kg/m³. The "poured bulk density" of a polymer is measurable according to DIN EN ISO 60: 1999. The density of solid inside the reactor is defined as the mass of polymer per volume of reactor occupied by the polymer.

In some embodiments, a downcomer is a part of the polymerization reactor containing a bed of growing polymer particles, which moves downwards in a plug flow mode. As used herein, the term "plug flow mode" refers to little or no backmixing of the polymer particles.

In some embodiments and for replacing reacted monomers and for controlling the gas flow within the downcomer, gaseous or liquid feed streams are introduced at one or more positions into the downcomer. In some embodiments, the feed streams are made from or containing ethylene. In some embodiments, the feed streams are made from or containing ethylene and one or more comonomers. In some embodiments, the feed streams are further made from or containing inert components or hydrogen. In some embodiments, the inert component is propane. In some embodiments, the gaseous medium surrounding the polymer particles move downwards concurrently with the polymer particles or upward countercurrently to the polymer particles. In some embodiments, the direction of movement for the gaseous medium is controlled by the amount of gaseous or liquid feed streams and pressure conditions. In some embodiments, liquid streams vaporize within the downcomer, thereby contributing to the composition of the reaction gas mixture within the downcomer. In some embodiments, the downcomer is operated with more than one feed stream. In some embodiments, the feeding points of the feed streams are evenly distributed over the height of the downcomer.

In some embodiments, the gas-phase polymerization reactor is a multizone circulating reactor. In some embodiments, the reactors are, as described in Patent Cooperation Treaty Publication Nos. WO 97/04015 A1 and WO 00/02929 A1. In some embodiments, the reactors have two interconnected polymerization zones, a riser, wherein the growing polymer particles flow upward under fast fluidization or transport conditions and a downcomer, wherein the growing polymer particles flow in a densified form under the action of gravity. The polymer particles leaving the riser enter the downcomer, and the polymer particles leaving the downcomer are reintroduced into the riser, thereby establishing a circulation of polymer between the two polymerization zones. In some embodiments, the polymer is passed a plurality of times through these two zones. In some embodiments, a solid/gas separator is arranged above the downcomer, thereby separating the polyethylene and reaction gaseous mixture coming from the riser. In some embodiments, the growing polyethylene particles enter the downcomer, and the separated reaction gas mixture of the riser is continuously recycled through a gas recycle line to one or more points of reintroduction into the polymerization reactor. In some embodiments, more than half of the recycle gas is recycled to the bottom of the riser. In some embodiments, the recycle line is equipped with a compressor and a heat exchanger for removing the heat of polymerization. In some embodiments, a line for the catalyst feed is arranged on the riser, and a polymer discharge system is in the bottom portion of the downcomer. In some embodiments, make-up monomers, comonomers, hydrogen, or inert components are introduced at various points along the riser and the downcomer.

In some embodiments, the reaction gas mixture leaving the riser unit is partially or totally prevented from entering the downcomer, thereby establishing different polymerization conditions between the riser unit and at least a part of the downcomer. In some embodiments, the reaction gas mixture leaving the riser unit is partially or totally prevented from entering the downcomer by feeding a barrier fluid in form of a gas and/or liquid mixture into the downcomer, alternatively in the upper part of the downcomer. In some embodiments, the composition of the barrier fluid differs from the composition of the gas mixture in the riser unit. In some embodiments, the amount of added barrier fluid is adjusted such that an upward flow of gas countercurrent to the flow of the polymer particles is generated and acts as a barrier to the gas mixture entrained with the particles coming from the riser unit. In some embodiments, the countercurrent occurs at the top of the riser unit.

In some embodiments, the barrier fluid comes from a recycle gas stream, alternatively is obtained by partly condensing the stream. In some embodiments, the barrier fluid is made from or containing a combination of the monomers to be polymerized, inert compounds, hydrogen, and other components of the reaction gas mixture. In some embodiments, the inert compounds as used as a polymerization diluent. In some embodiments, the inert compounds are selected from the group consisting of nitrogen and alkanes having from 1 to 10 carbon atoms.

In some embodiments, the polymerization in the gas-phase polymerization reactor is carried out in a condensing or super-condensing mode, wherein part of the circulating reaction gas mixture is cooled to below the dew point and returned to the reactor separately as a liquid, separately as a gas-phase, or together as a liquid-gas phase mixture, thereby using the enthalpy of vaporization for cooling the reaction gas.

In some embodiments, the gas-phase polymerization reactor, including the riser unit and the downcomer, is part of a series of polymerization reactors. In some embodiments, polymerization reactors of the series of polymerization reactors are low-pressure polymerization reactors. In some embodiments, the low-pressure polymerization reactors are as-phase reactors or suspension reactors. In some embodiments, the suspension polymerization is carried out upstream of the gas-phase polymerization. In some embodiments, the suspension polymerization is carried out in loop reactors or stirred tank reactors. In some embodiments, the suspension media are selected from the group consisting of inert hydrocarbons and the monomers. In some embodiments, the inert hydrocarbons are isobutane or mixtures of hydrocarbons. In some embodiments, additional polymerization stages are carried out in suspension and include a pre-polymerization stage. In some embodiments, the multistage polymerization includes additional polymerization stages carried out in gas-phase. In some embodiments, the additional gas-phase polymerization reactors are horizontally or vertically stirred gas-phase reactors, fluidized-bed reactors, or multizone circulating reactors. In some embodiments, the additional gas-phase polymerization reactors are arranged downstream or upstream of the gas-phase polymerization reactor. In some embodiments, the gas-phase polymerization reactor, including the riser unit and the downcomer, is part of a series of polymerization reactors wherein a fluidized-bed polymerization reactor is arranged upstream of the gas-phase polymerization reactor.

FIG. 1 shows a schematic of a series of polymerization reactors, including a fluidized-bed reactor and a multizone circulating reactor, for preparing bimodal or multimodal polyethylenes.

The first gas-phase reactor, fluidized-bed reactor (1), includes a fluidized bed (2) of polyethylene particles, a gas distribution grid (3), and a velocity reduction zone (4). In some embodiments, the velocity reduction zone (4) is of increased diameter compared to the diameter of the fluidized-bed portion of the reactor. An upward flow of gas fed through the gas distribution grid (3), placed at the bottom portion of the reactor (1), keeps the polyethylene bed in a fluidized state. The gaseous stream of the reaction gas mixture leaving the top of the velocity reduction zone (4) via recycle line (5) is compressed by compressor (6), transferred to a heat exchanger (7), wherein the gaseous stream is cooled, and then recycled to the bottom of the fluidized-bed reactor (1) at a point below the gas distribution grid (3) at position (8). In some embodiments, the recycle gas is cooled to below the dew point of one or more of the recycle gas components in the heat exchanger, thereby operating the reactor with condensed material or in the condensing mode. In some embodiments, the recycle gas is made from or containing a combination of unreacted monomers, inert condensable gases, inert non-condensable gases. In some embodiments, the inert non-condensable gas is nitrogen. In some embodiments, the inert condensable gases are alkanes. In some embodiments, make-up monomers, hydrogen, optional inert gases, or process additives are fed into the reactor (1) at various positions, alternatively via line (9) upstream of the compressor (6). In some embodiments, the catalyst is fed into the reactor (1) via a line (10). In some embodiments, line (10) is placed in the lower part of the fluidized bed (2).

The polyethylene particles obtained in fluidized-bed reactor (1) are discontinuously discharged via line (11) and fed to a solid/gas separator (12), thereby preventing entry of the gaseous mixture, coming from the fluidized-bed reactor (1), into the second gas-phase reactor. The gas leaving solid/gas separator (12) exits the reactor via line (13) as off-gas while the separated polyethylene particles are fed via line (14) to the second gas-phase reactor.

The second gas-phase reactor is a multizone circulating reactor (21), including a riser (22) and a downcomer (23) which are repeatedly passed by the polyethylene particles. Within riser (22), the polyethylene particles flow upward under fast fluidization conditions along the direction of arrow (24). Within the downcomer (23) and under the action of gravity, the polyethylene particles flow downward along the direction of the arrow (25). The riser (22) and the downcomer (23) are interconnected by the interconnection bends (26) and (27).

After flowing through the riser (22), the polyethylene particles and the reaction gas mixture leave riser (22) and are conveyed to a solid/gas separation zone (28). In some embodiments, solid/gas separation is effected by a centrifugal separator like a cyclone. From the separation zone (28), the polyethylene particles enter downcomer (23).

The reaction gas mixture leaving the separation zone (28) is recycled to the riser (22) via recycle line (29), equipped with a compressor (30) and a heat exchanger (31). Between the compressor (30) and the heat exchanger (31), recycle line (29) splits. Accordingly, the gaseous mixture is divided into two streams: line (32) conveys a first part of the recycle gas into the interconnection bend (27) while line (33) conveys a second part of the recycle gas to the bottom of riser (22), thereby establishing fast fluidization conditions therein.

The polyethylene particles coming from the first gas-phase reactor via line (14) enter the multizone circulating reactor (21) at the interconnection bend (27) in position (34). The polyethylene particles obtained in multizone circulating reactor (21) are continuously discharged from the bottom part of downcomer (23) via the discharge line (35).

A part of the gaseous mixture leaving the separation zone (28) exits the recycle line (29) after having passed the compressor (30) and is sent through line (36) to the heat exchanger (37), where the part is cooled to a temperature at which the monomers and the optional inert gas are partially condensed. A separating vessel (38) is placed downstream of the heat exchanger (37). The separated liquid is withdrawn from the separating vessel (38) via line (39) and fed to downcomer (23) through lines (40), (41), (42) and (43) by pump (44), wherein the feed stream introduced via line (40) is supplied to generate the barrier for preventing the reaction gas mixture of the riser (22) from entering the downcomer (23). In some embodiments, a combination of make-up monomers, make-up comonomers, optionally inert gases, and optionally process additives are introduced via lines (45), (46) and (47) into lines (41), (42) and (43) and then fed into the downcomer (23) at monomer feeding points (48), (49) and (50). In some embodiments, a combination of make-up monomers, make-up comonomers, optionally inert gases, and optionally process additives are introduced into the recycle line (29) via line (51). The gaseous mixture obtained as gas-phase in the separating vessel (38) is recirculated to recycle line (29) through line (52).

The bottom of the downcomer (23) is equipped with a control valve (53) having an adjustable opening for adjusting the flow of polyethylene particles from downcomer (23) through the interconnection bend (27) into the riser (22).

Above the control valve (53), amounts of a recycle gas mixture coming from the recycle line (29) through line (54) are introduced into the downcomer (23), thereby facilitating flow of the polyethylene particles through the control valve (53).

In some embodiments, the polymerization for preparing the bimodal or multimodal polyethylenes is carried out using Phillips catalysts based on chromium oxide, titanium-based Ziegler- or Ziegler-Natta-catalysts, single-site catalysts, or mixtures of such catalysts. In some embodiments, the polymerization catalyst is a Ziegler- or Ziegler-Natta-catalyst made from or containing a reaction product of an aluminum alkyl with a titanium compound supported on a magnesium halide.

In some embodiments, the bimodal or multimodal polyethylenes are obtained in the polymerization in the form of a polyethylene powder. As used herein, the term "powder" refers to particles having mass-median-diameter D50 in the range from 300 μm to 2500 μm, alternatively from 400 μm to 2300 μm, alternatively from 800 μm to 2100 μm, determined by dry sieving analysis according to DIN 53477 (November 1992).

In some embodiments, the bimodal or multimodal polyethylenes have a density from to 0.968 g/cm$^3$, alternatively in the range from 0.945 to 0.965 g/cm$^3$, alternatively in the range of from 0.945 to 0.955 g/cm$^3$. As used herein, the term "density" refers to the density determined according to DIN EN ISO 1183-1:2004, Method A (Immersion) with compression molded plaques of 2 mm thickness which were pressed at 180° C., 20 MPa for 8 minutes with subsequent crystallization in boiling water for 30 minutes.

In some embodiments, the bimodal or multimodal polyethylenes have a melt flow rate MFR$_{21.6}$ at 190° C. under a load of 21.6 kg, determined according to DIN EN ISO 1133:2005 condition G, from 0.5 to 300 g/10 min, alternatively from 1 to 100 g/10 min, alternatively from 1.2 to 100 g/10 min, alternatively from 1.5 to 50 g/10 min.

In some embodiments, the bimodal or multimodal polyethylene has a M$_w$/M$_n$ from 15 to alternatively from 20 to 35, where M$_w$ is the weight average molecular weight and M$_n$ is the number average molecular weight, measured by GPC (Gel Permeation Chromatography). In some embodiments, the GPC is a high-temperature gel permeation chromatography carried out as described in ISO 16014-1, -2, -4, issues of 2003, wherein 1,2,4-trichlorobenzene (TCB) is used as solvent, the temperature of apparatus and solutions are 135° C., and an infrared detector capable for use with TCB is employed as a concentration detector.

In some embodiments, the polyethylene compositions are prepared in an extruder device. In some embodiments, the extruder devices are extruders or continuous mixers. In some embodiments, the extruders or mixers are single- or two-stage machines which melt and homogenize the polyethylene composition. In some embodiments, the extruders are selected from the group consisting of pin-type extruders, planetary extruders, and co-rotating disk processors. In some embodiments, the mixers are in combination with discharge screws or gear pumps. In some embodiments, the extruders are screw extruders, alternatively extruders constructed as twin-screw machine. In some embodiments, the extruder device is selected from the group consisting of twin-screw extruders and continuous mixers with discharge elements. In some embodiments, the extruder device is a continuous mixer with counter-rotating twin rotor or a co-rotating twin screw extruder. In some embodiments, the extruder device is commercially available from Coperion GmbH, Stuttgart, Germany; KraussMaffei Berstorff GmbH, Hannover, Germany; The Japan Steel Works LTD., Tokyo, Japan; Farrel Corporation, Ansonia, USA; or Kobe Steel, Ltd., Kobe, Japan. In some embodiments, the extruder devices are equipped with units for pelletizing the melt, such as underwater pelletizers.

In some embodiments, the extruder device is a combination of a first and a second co-rotating twin-screw extruders, wherein the first twin-screw extruder receives the mixture made from or containing the polyethylene powder and the additives and forms a molten polymer stream therefrom and wherein the second twin-screw extruder receives the molten polymer stream and completes the homogenization process. In some embodiments, the polyethylene compositions are prepared in a counter-rotating continuous mixer equipped with gear pump or in a co-rotating twin screw extruder equipped with gear pump.

In some embodiments and as step a) of the process, a bimodal or multimodal polyethylene is supplied in form of a polyethylene powder to a mixing device. In some embodiments, the mixing device allows dry-blending of particles. In some embodiments, the mixing device operates continuously or discontinuously. In some embodiments, the mixing device operates continuously.

In some embodiments, the dry-blending devices are paddle mixers having one or two horizontally orientated rotating shafts, alternatively two horizontally orientated counter-rotating shafts. The rotating shafts move the composition of polyethylene powder and additives horizontally along the axis of the shafts and at the same time mix the composition intensively. In some embodiments, paddle mixers are commercially available from Köllemann GmbH, Adenau, Germany or J. Engelsmann AG, Ludwigshafen, Germany. In some embodiments, the mixing devices are vertical batch mixers. In some embodiments, the vertical batch mixers are commercially available under the trademark Henschel-Mixers® from Zeppelin Systems GmbH, Kassel, Germany. In some embodiments, the dry-blending devices are single screw conveyors equipped with blending elements. In some embodiments, the blending elements are amendable devices or slotted flights, thereby controlling the level of blending. In some embodiments, the amendable devices are adjustable paddles.

In step b) of the process, an additive, which is not an organic peroxide, is supplied to the mixing device. For multimodal polyethylenes, the additive is uniformly distributed within the polyethylene. In some embodiments, the additive is selected from the group consisting of antioxidants, melt stabilizers, light stabilizers, acid scavengers, lubricants, processing aids, antiblocking agents, slip agents, antistatics agents, antifogging agents, pigments or dyes, nucleating agents, flame retardants, and fillers. In some embodiments, several additives are added to the polyethylene compositions. In some embodiments, the additives are different types of additives or different representatives of the same type of additive. In some embodiments, additives are commercially available and as described in Hans Zweifel, Plastics Additives Handbook, 5th Edition, Munich, 2001.

Step c) of the process provides mixing the polyethylene powder and the additive at a temperature in the range from 10° C. to 100° C., without melting the polyethylene powder. In some embodiments, the mixing of step c) is carried out at a temperature in the range from 20° C. to 90° C., alternatively from 60° C. to 80° C.

In some embodiments, the mixing of step c) is carried out in an atmosphere of reduced oxygen content. In some embodiments, the atmosphere of reduced oxygen content is achieved by injecting nitrogen into the mixing device. In some embodiments, the oxygen content in the gas phase within the mixing device is less than 5 vol %, alternatively less than 1 vol %, alternatively less than 0.2 vol %.

In some embodiments, the mixture made from or containing the polyethylene powder and the additive is transferred in step d) from the mixing device into the extruder device. In some embodiments, the mixture is transferred to a hopper of the extruder device and then introduced from the hopper into the extruder device. In some embodiments, the transfer of the mixture into the extruder device occurs by gravity. In some embodiments, the mixture is transferred into the extruder device in an atmosphere of reduced oxygen content. In some embodiments, the atmosphere of reduced oxygen content is achieved by injecting nitrogen into the hopper. In some embodiments, the oxygen content in the gas phase within the hopper is less than 5 vol %, alternatively less than 1 vol %, alternatively less than 0.2 vol %.

Within the extruder device, in step e), the mixture is melted and homogenized, thereby forming a molten polyethylene composition. In some embodiments, step e) occurs by applying heat and mechanical energy to the mixture. In some embodiments, the specific energy, that is, the combined amount of heat and mechanical energy applied per amount of material being processed, is from 120 kWh/t to 350 kWh/t, alternatively from 160 kWh/t to 300 kWh/t, alternatively from 200 kWh/t to 260 kWh/t.

Step e) results in a homogenization of the polyethylene melt and a uniform distribution of the additive within the polyethylene melt.

In some embodiments, the molten polyethylene composition is passed through a melt filter before being pelletized. In some embodiments, the melt filters include one or more active screens, having a mesh opening from 50 μm to 400 μm. In some embodiments, the active screens have a mesh opening from 75 μm to 200 μm. In some embodiments, the melt filters have at least two screens, having a mesh opening from 205 μm to 350 μm. In some embodiments, the combinations of screens are as described in Patent Cooperation Treaty Publication No. WO 2012/152775 A1.

Subsequent step f) of the process provides pelletizing the molten polyethylene composition, thereby transforming the molten polyethylene composition into pellets.

In some embodiments, the process further provides adding a liquid made from or containing an organic peroxide to the polyethylene powder. In some embodiments, the liquid is a liquid peroxide. In some embodiments, the liquid is a solution of a peroxide. In some embodiments, the liquid is added to the polyethylene powder in an amount of from 20 ppm to 200 ppm, alternatively from 40 ppm to 150 ppm, alternatively from 45 ppm to 95 ppm, of organic peroxide with respect to the polyethylene powder. In some embodiments, the organic peroxide is selected from the group consisting of dicumyl peroxide, di-tert-butyl peroxide, tert-butylperoxybenzoate, 2,5-dimethyl-2,5-di(tert-butylperoxy) hexane, 3,6,9-triethyl-3,6,9-trimethyl-1,2,4,5,7,8-hexoxonane, representatives of 3,6,9-trimethyl-3,6,9-tris(alkyl)-1,2,4,5,7,8-hexoxonanes wherein the alkyl radical is propyl or ethyl, tert-butyl peroxyneodecanoate, tert-amyl peroxypivalate, and 1,3-bis(tert-butylperoxyisopropyl)benzene. In some embodiments, the organic peroxide is selected from the group consisting of 2,5-dimethyl-2,5-di(tert-butylperoxy)hexane, 3,6,9-triethyl-3,6,9-trimethyl-1,2,4,5,7,8-hexoxonane, and representatives of 3,6,9-trimethyl-3,6,9-tris(alkyl)-1,2,4,5,7,8-hexoxonanes wherein the alkyl radical is propyl or ethyl.

In some embodiments, the organic peroxide is a solution, wherein the diluent is a hydrocarbon. In some embodiments, the peroxide solutions have a content of active oxygen in the range from 0.1 wt. % to 10 wt. %, alternatively from 0.2 wt. % to 5 wt. %, alternatively from 0.3 wt. % to 2 wt. %, alternatively from 0.5 wt. % to 1 wt. %.

In some embodiments, the liquid is added to the polyethylene powder or the mixture at a position where mixing occurs and where the polyethylene powder has a temperature of from 10° C. to 100° C., alternatively from 20° C. to 90° C., alternatively from 60° C. to 80° C.

In some embodiments, the liquid is added to the polyethylene powder or to the mixture in the mixing device prior or during step c). In some embodiments, the liquid is added to the polyethylene powder before adding additives, after adding additives, or together with additives. In some embodiments, the liquid is added to the polyethylene powder after adding additives, that is, the liquid is added to the mixture made from or containing the polyethylene powder and the additive.

In some embodiments, the liquid is added to the mixture in the extruder device at a position where the mixture is not yet molten prior to step e).

In some embodiments, the liquid is added to the polyethylene powder by passing the liquid with an injection pressure of from 0.5 to 4 MPa, alternatively from 1 to 2 MPa, through a spring injector having a preloaded spring.

Figure 2:
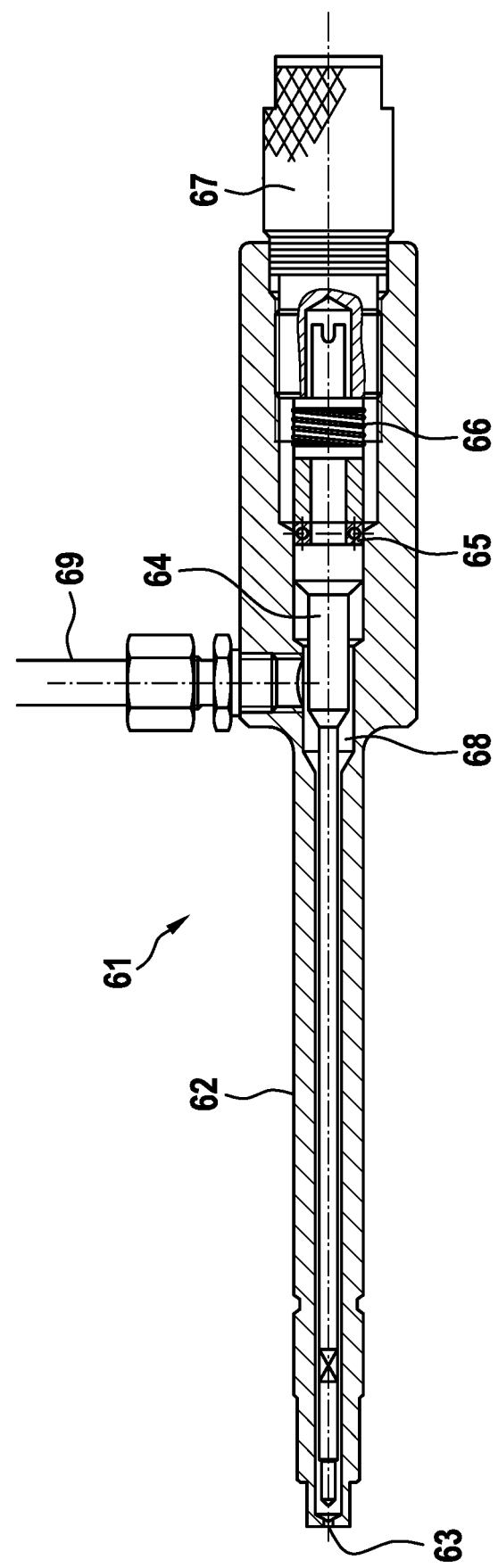
FIG. 2 shows a schematic of a spring injector for adding a liquid made from or containing an organic peroxide to a polyethylene powder.

FIG. 2 shows a schematic of a spring injector for adding a liquid made from or containing an organic peroxide to a polyethylene powder. The spring injector (61) has a body (62), an injection orifice (63), an internal needle (64), a sealing device (65), a compression spring (66), a compression adjustment knob (67) for setting the spring preload, and an injection chamber (68). In some embodiments, the liquid is continuously fed through feeding pipe (69) into the injection chamber (68). Compression spring (66) pushes the needle (64) against the injection orifice (63) according to the preload of compression spring (66). Once the pressure within the injection chamber (68) overcomes the preload on the compression spring (66), the peroxide solution is finely sprayed over the polyethylene powder. Additionally, the preload of the compression spring (66) prevents powdery material, such as polyethylene fines or additives, from entering the injection chamber (68) and related blockings.

Figure 3:
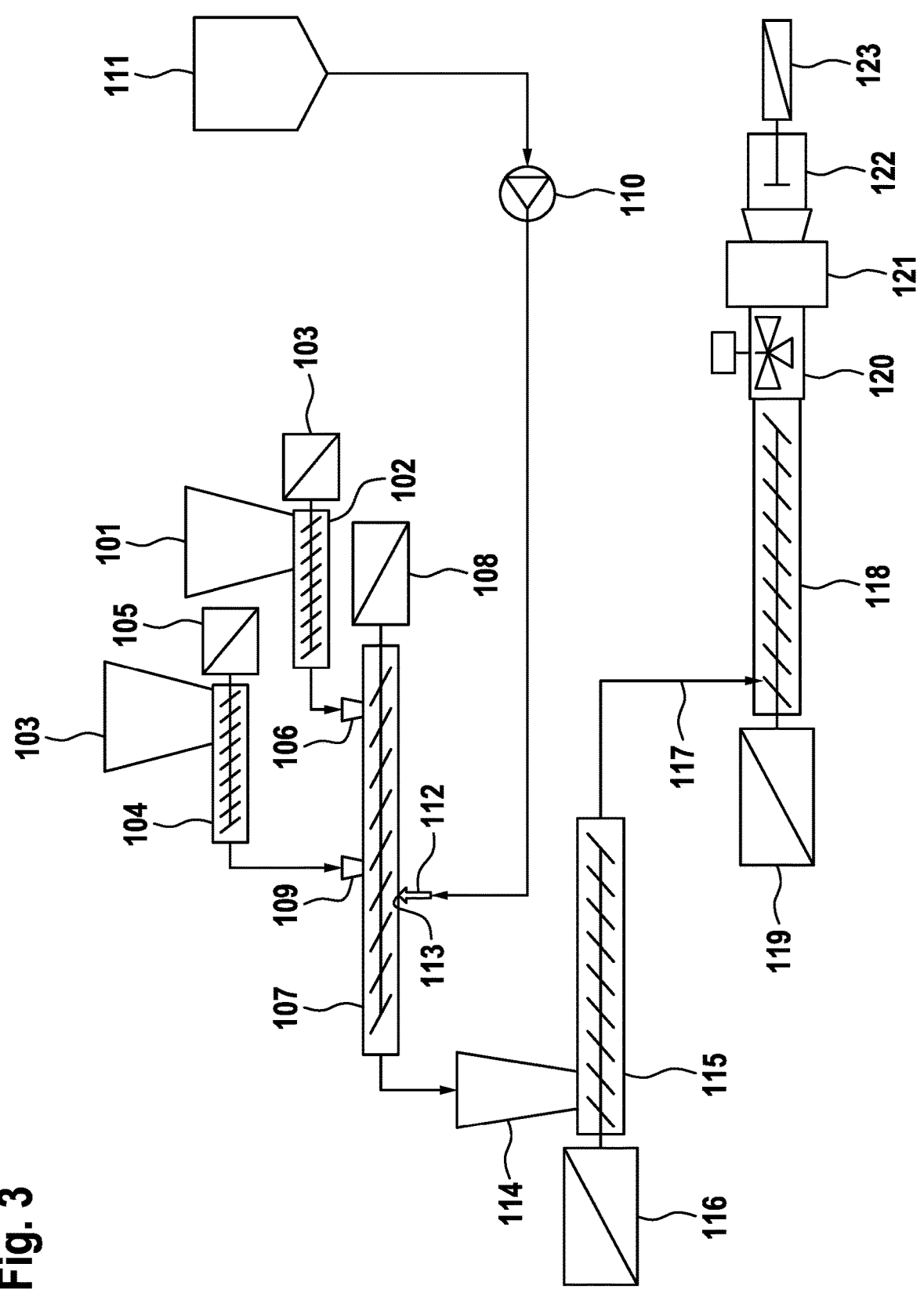
FIG. 3 shows for a schematic of a process for preparing a polyethylene composition, wherein a liquid made from or containing an organic peroxide is added to a polyethylene powder in a mixing device.

FIG. 3 shows a schematic of a process for preparing a polyethylene composition, wherein a liquid made from or containing an organic peroxide is added to a polyethylene powder in a mixing device.

Polyethylene powder is provided to hopper (101) of a dosing device (102), which is operated by a motor (103). A mixture of additives is provided to hopper (103) of a second dosing device (104), which is operated by a motor (105). Dosing device (102) feeds the polyethylene powder to a hopper (106) of a screw conveyor (107), which is operated by a motor (108). Dosing device (104) feeds the mixture of additives to a hopper (109) of screw conveyor (107) which is located downstream of hopper (106). A peroxide solution is transferred by a pump (110) from a storage vessel (111) to the screw conveyor (107) and injected through injector (112) into the screw conveyor (107) at a position (113) downstream of hopper (109).

Screw conveyor (107) feeds the mixture of polyethylene powder, additives, and peroxide solution to a hopper (114) of a first extruder (115), which is operated by a motor (116). Within extruder (115), the mixture is melted and homogenized.

Extruder (115) feeds the molten mixture via a line (117) into a second extruder (118), which is operated by a motor (119). Within extruder (118), the homogenization of the molten mixture is completed. The homogenized melt is passed through a startup valve (120) and a melt filter (121) and transferred into an underwater pelletizer (122) operated by a motor (123) for forming pellets.

Figure 4:
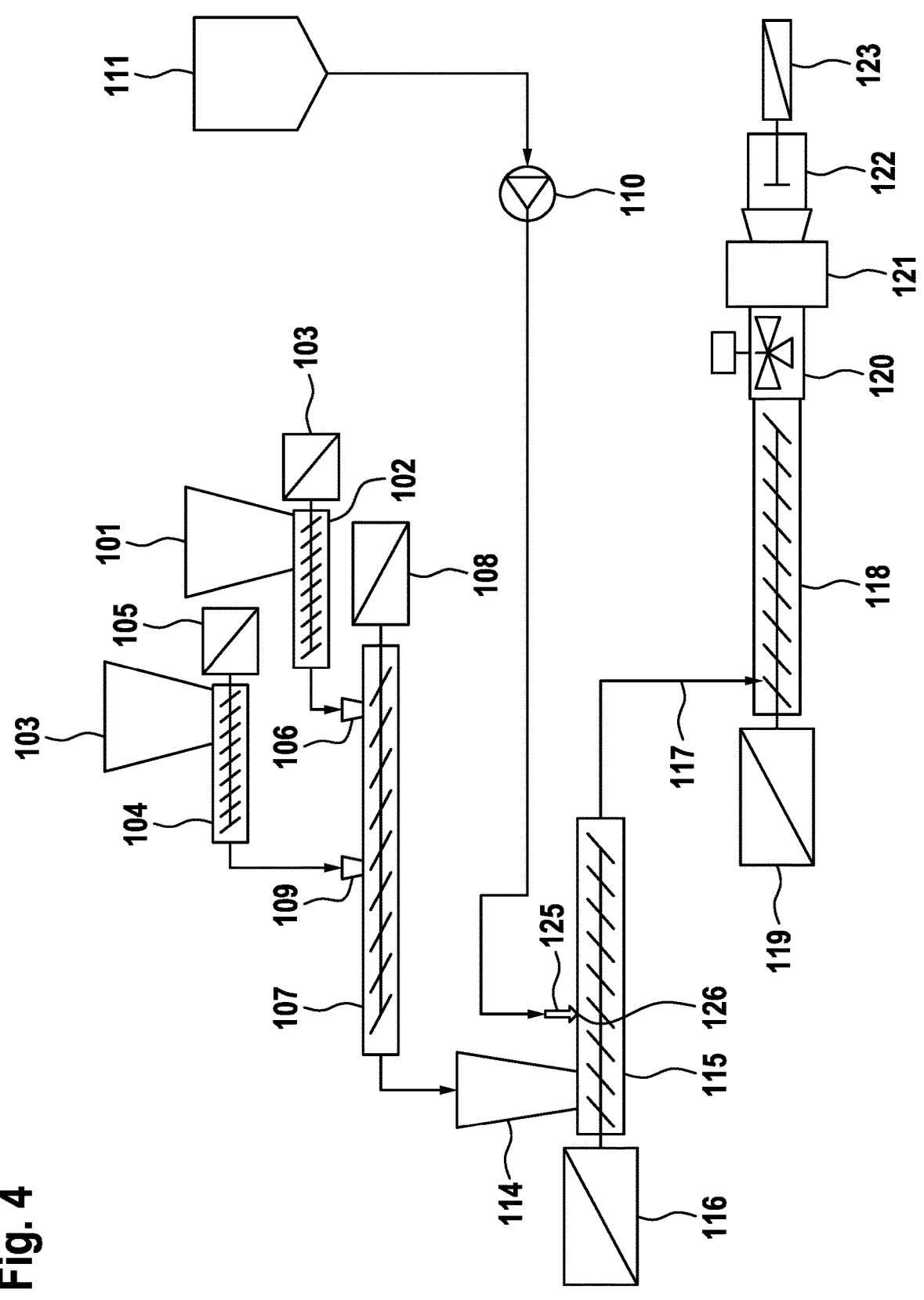
FIG. 4 shows a schematic of a process for preparing a polyethylene composition, wherein a liquid made from or containing an organic peroxide is added to a polyethylene powder in an extruder device.

FIG. 4 shows a schematic of a process for preparing a polyethylene composition wherein a liquid made from or containing an organic peroxide is added to a polyethylene powder in an extruder device.

The schematic shown in FIG. 4 is identical with the schematic shown in FIG. 3, except that the peroxide solution is transferred by pump (110) from storage vessel (111) to the first extruder (115) and injected through injector (125) into extruder (115) at a position (126) downstream of hopper (114) where the polyethylene powder is not yet molten.

Figure 5:
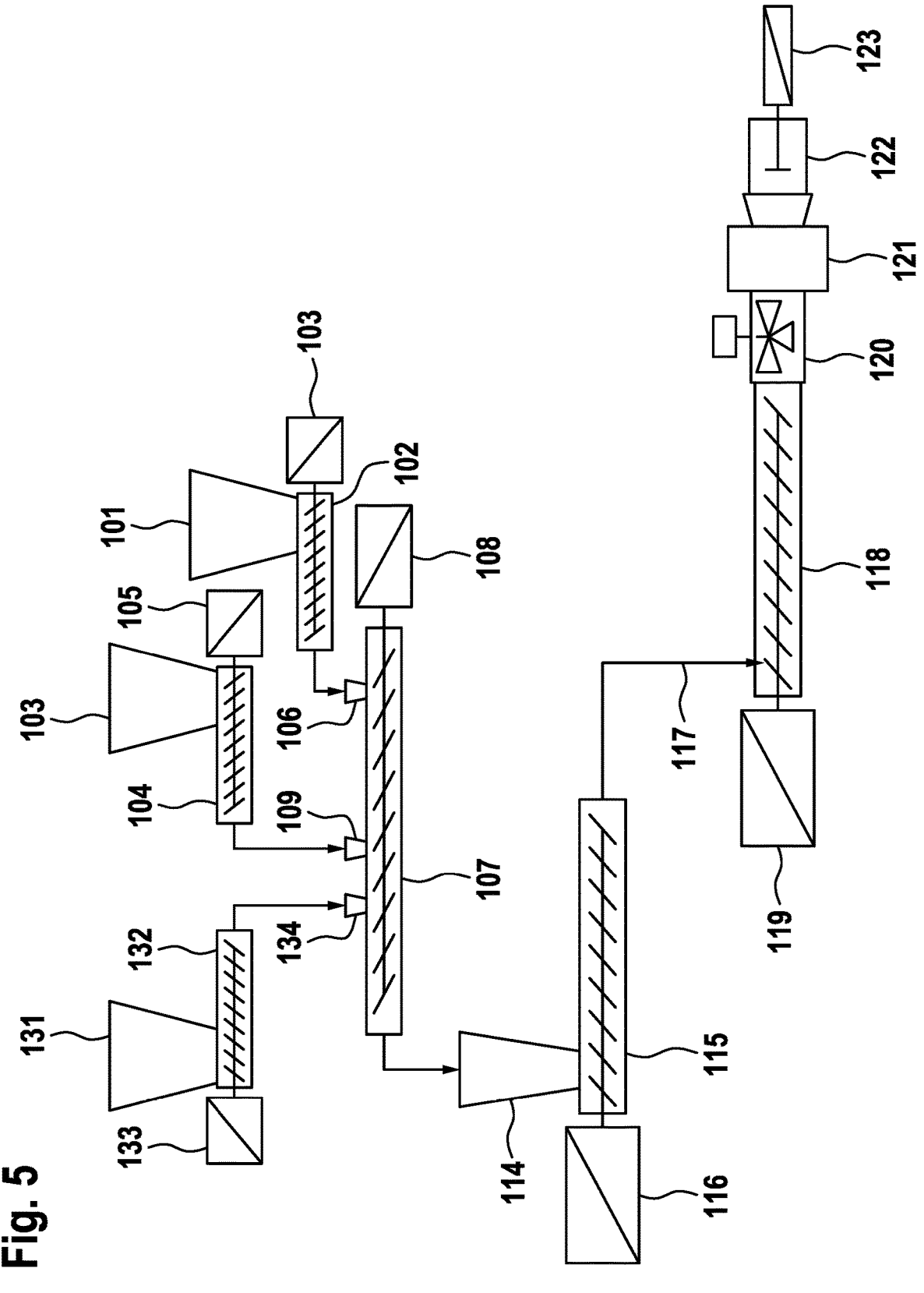
FIG. 5 shows schematic of a process for preparing a polyethylene composition, wherein a solid mixture of an organic peroxide and a polymeric carrier is added to a polyethylene powder in a mixing device.

FIG. 5 shows a schematic of a process for preparing a polyethylene composition, wherein a solid mixture of an organic peroxide and a polymeric carrier is added to a polyethylene powder in a mixing device.

The schematic shown in FIG. 5 is identical with the schematic of a process for preparing a polyethylene composition shown in FIG. 4, except that peroxide solution is not provided to the screw conveyor (107). Instead, an organic peroxide on a polymeric carrier is provided to hopper (131) of dosing device (132), which is operated by a motor (133), and dosing device (132) feeds the organic peroxide on the polymeric carrier to a hopper (134) of screw conveyor (107) which is located downstream of hopper (109).

In some embodiments, the present disclosure provides a process for preparing blown films made from or containing the polyethylene composition. In some embodiments, the process for preparing the polyethylene composition is carried out continuously.

In some embodiments, the present disclosure provides a process for preparing a pipe including the steps of a) preparing a polyethylene composition and b) forming the polyethylene composition into a pipe. In some embodiments, the pipe has a SAG value of from 10 to 17.

EXAMPLES

The melt flow rate 1V1FR5 was determined according to DIN EN ISO 1133-1:2012-03 at a temperature of 190° C. under a load of 5 kg.

The SAG values were determined in a rotational parallel plate rheometer with a shear stress of 300 Pa for 5200 seconds at 230° C. with plate opening of 1 mm. The SAG values are defined as $\frac{1}{10}^{th}$ of a percent of creep strain measured at the end of the test. It is believed that lower SAG values correspond to a more uniform pipe thickness.

The gel count and gel area were determined by preparing a cast film, analyzing the film defects by an optical scanning device, and classifying and counting the film defects according to size (circle diameter). The films were prepared by an extruder (type Collin 25) equipped with a chill roll and winder (model Collin Chill Roll 144/230) and analyzed by an optical film surface analyzer with flash camera system, model FSA100 (produced by OCS Optical Control Systems GmbH, Witten, Germany). The apparatus had the following characteristics screw diameter: 25 mm;
    screw length: 25 D;
    compression ratio: 3.5:1;
    screw layout 27 D: 9 D feeding, 7 D compression, 9 D
      metering;
    die width (slit die): 150 mm;
    resolution: 25 μm×25 μm;
and was operated under the following conditions T 1 200° C.;
    T 2 210° C.;
    T 3 220° C.;
    T 4, 5 (adapter) 230° C.;
    T 6, 7, 8 (die) 240° C.;
    take off speed 3.0 m/min;
    screw speed to be adjusted to film thickness 50 μm;
    throughput 1.0 to 1.5 kg/h (target 1.15 kg/h);
    air shower ON,
    chill roll temperature 60° C.;
    camera threshold threshold 1: 50%-threshold 2: 45%.

For starting the measurement, extruder and take off unit were set to the conditions and started with a standard material having a certain gel level. The film inspection software was started when the extruder showed steady conditions of temperature and melt pressure. After having operated the extruder with the starting material for at least half an hour or after the gel count having reached the certain gel level, the first sample to measure was fed to the extruder. After reaching a stable gel level for 45 minutes, the counting process was started until the camera had inspected an area of at least 3 $m^2$ of film. Thereafter, the next sample was fed to the extruder. After reaching a stable gel count for 45 minutes, the counting process for the next sample was started. The counting process was set for the samples such that the camera inspected an area of at least 3 $m^2$ of film and the number of measured defects per size-class was normalized to 1 $m^2$ of film.

The determination of the particle size distribution was carried out by dry sieving analysis according to DIN 53477 (November 1992), using a AS 200 control vibratory sieve shaker (Retsch GmbH, Haan, Germany) with a set of 7 calibrated sieves (125 μm, 250 μm, 500 μm, 710 μm, 1000 μm, 1400 μm, and 2000 μm). The mass-median-diameter D50 of the polyethylene particles was obtained by calculating the particle size distribution using the software Easy Sieve 4.0 of the apparatus, after weighing the fractions on each sieve.

Example 1

A polyethylene was prepared in a series of a fluidized-bed reactor and a multizone circulating reactor (MZCR) having two interconnected reaction zones, as shown in FIG. 1.

12 g/h of a Ziegler-Natta catalyst, which catalyst was prepared according to Example 6 of Patent Cooperation Treaty Publication No. WO2018/114453 A1, were fed using 0.7 kg/h of liquid propane to a first stirred precontacting vessel, into which additionally triisobutylaluminum (TIBA) and diethylaluminum chloride (DEAC) were dosed. The weight ratio of TIBA to DEAC was 7:1. The weight ratio of the aluminum alkyls to the catalyst solid was 5:1. The first precontacting vessel was kept at 50° C. with a residence time of 30 minutes. The catalyst suspension of the first precontacting vessel was continuously transferred to a second stirred precontacting vessel, which was operated with a residence time of 30 minutes and kept at 50° C. The catalyst suspension was then transferred continuously to a fluidized-bed reactor (1) via line (10).

In the fluidized-bed reactor (1), ethylene was polymerized in the presence of propane as an inert diluent and hydrogen as molecular weight regulator. 50 kg/h of ethylene and 230 g/h of hydrogen were fed to the fluidized-bed reactor (1) via line (9). No comonomer was added. The polymerization was carried out at a temperature of 80° C. and a pressure of 2.9 MPa.

The polyethylene obtained in the fluidized-bed reactor (1) had an $MFR_{2.16}$ of 80 g/10 min and a density of 0.967 g/cm³.

The polyethylene obtained in the fluidized-bed reactor (1) was continuously transferred to a multizone circulating reactor (21), which was operated at a pressure of 2.5 MPa and a temperature of 80° C., measured at the beginning of line (29), after the reaction gas mixture entered from separation zone (28). The riser (22) had an internal diameter of 200 mm and a length of 19 m. The downcomer (23) had a total length of 18 m, divided into an upper part of 5 m with an internal diameter of 300 mm, a lower part of 13 m with an internal diameter of 150 mm and in-between the upper part and the lower part a conical part having a length of 0.43 m. The final polymer was discontinuously discharged via line (35).

50 kg/h of a liquid stream were fed as barrier fluid into the upper part of the downcomer (23) via line (40). The liquid for generating the barrier originated from partially condensing recycle gas mixture in heat exchanger (37) at working conditions of 60° C. and 2.5 MPa and separating liquid and gaseous components in separating vessel (38). The liquid barrier fluid had a composition that the gas produced by vaporizing the barrier fluid had 4.2 vol. % ethylene, 0.02 vol. % hydrogen, 0.6 vol. % 1-hexene, and 95.18 vol. % propane.

Additional monomers were fed to the downcomer at three monomer feeding points below the barrier. The combined quantity of fresh monomers fed into the downcomer (23) were 20 kg/h of ethylene and 1.7 kg/h of 1-hexene. Additionally, 5 kg/h of propane, 25.5 kg/h of ethylene, and 1.3 g/h of hydrogen were fed through line (51) into the recycle line (29).

Of the polyethylene finally obtained in the series of the fluidized-bed reactor (1) and the multizone circulating reactor (21), 51% by weight were produced in the fluidized-bed reactor (1) and 49% by weight were produced in the multizone circulating reactor (21).

The finally obtained polyethylene had an Wits of 0.21 g/10 min and a density of g/cm³. The mass-median-diameter D50 of the polyethylene powder was 1624 μm.

Example 2

To provide the polyethylene powder obtained in Example 1 with additives, Songnox 1010 (commercially available from SONGWON Industrial Co., Ltd., Ulsan, South Korea), Irgafos 168 (commercially available from BASF SE, Ludwigshafen, Germany), and Calcium Stearate "M" (commercially available from So.G.I.S. Industria Chimica Spa, Sospiro, Italy) were mixed by a Mixaco LAB high speed mixer (MIXACO Maschinenbau, Neuenrade, Germany) to form a homogeneous powder premix. The resulting additive powder premix and the polyethylene powder prepared in Example 1 were metered at two different feeding points as shown in FIG. 3 to a screw conveyor provided by Somef Officina Meccanica E Fonderia, Occhiobello, Italia and intimately mixed therein. The feeding rate of the final polyethylene powder obtained in Example 1 to the conveyor screw was 125 kg/h. The amounts of added additives correspond to a content of additives in the final polyethylene composition of 1600 ppm by weight Songnox 1010, 1600 ppm by weight Irgafos 168, and 1200 ppm by weight Calcium Stearate M. To prevent the presence of oxygen, nitrogen was injected into the screw conveyor at a feed rate of 0.5 m³/h An homogeneous solution of 6 wt. % 2,5-dimethyl-2,5-di-(tert.-butylperoxy)-hexane (Peroxan HX, commercially available from PERGAN GmbH, Bocholt, Germany) and 94 wt. % paraffinic oil OB 22 AT (commercially available from Conqord Oil S.R.L., Castellar Guidobono, Italy), resulting in a solution containing 0.606 wt. % of active oxygen, was metered in the screw conveyor as shown in FIG. 3 using a liquid injector as shown in FIG. 2 provided by Coperion GmbH, Stuttgart, Germany with an injection pressure of 1 MPa. The added amount of the peroxide solution was at 1083 ppm by weight (corresponding to 65 ppm by weight of 2,5-dimethyl-2,5-di-(tert.-butyl-peroxy)-hexane) with respect to the final polyethylene composition.

The homogenous mixture made from or containing polyethylene powder, additives, and peroxide generated by the screw conveyor mixer was then fed to the feeding hopper of a ZSK NT extrusion line (Coperion GmbH, Stuttgart, Germany) having a first twin-screw extruder ZSK 50 and a second twin-screw extruder ZSK 58. The mixture was then subjected to melting, homogenization, and melt filtering steps. The molten composition was then pelletized using a Filtec UW50 underwater pelletizing system (Filtec srl, Badia Polesine, Italy). For melt filtering, the melt was passed through a screen pack composed of four 60 mesh metallic nets and a 20 mesh metallic net, acting as mechanical support.

The applied operating conditions and the results of the characterizations of the pellet samples are indicated in Table 1.

Example 3

The process of Example 2 was repeated at the same conditions except that 1333 ppm by weight of the peroxide solution (corresponding to 80 ppm by weight of 2,5-dimethyl-2,5-di-(tert.-butylperoxy)-hexane) were added with respect to the final polyethylene composition.

The applied operating conditions and the results of the characterizations of the pellet samples are indicated in Table 1.

Example 4

The process of Example 3 was repeated at the same conditions except that (i) no peroxide solution was metered in the screw conveyor and (ii) a homogenous mixture made from or containing polyethylene powder and additives generated by the screw conveyor mixer was fed to the feeding hopper of a ZSK NT 50/58 extrusion line.

Using a liquid injector as shown in FIG. 2 provided by Coperion GmbH, Stuttgart, Germany with an injection pressure of 1 MPa, the peroxide solution was metered as shown in FIG. 4 into the first twin-screw extruder ZSK 50 at a position before the melting of the polymer where the extruder temperature was 80° C. The added amount of the peroxide solution was at 1333 ppm by weight (corresponding to 80 ppm by weight of 2,5-dimethyl-2,5-di-(tert.-butylperoxy)-hexane) with respect to the final polyethylene composition.

The applied operating conditions and the results of the characterizations of the pellet samples are indicated in Table 1.

Comparative Example A

The process of Example 2 was repeated at the same conditions except that no peroxide was added.

The resulting polyethylene composition yielded a SAG value of 45, indicating the resulting polyethylene composition was not suited for producing large diameter pipes.

Comparative Example B

The process of Example 2 was repeated at the same conditions except that no peroxide solution was metered in the screw conveyor. Instead, a 20 wt. % mixture of 2,5-dimethyl-2,5-di-(tert.-butylperoxy)-hexane with polypropylene (PERGAPROP HX-20 PP, commercially available from PERGAN GmbH, Bocholt, Germany) was metered in the screw conveyor as shown in FIG. 5. The added amount of the peroxide mixture was at 325 ppm by weight (corresponding to 65 ppm by weight of 2,5-dimethyl-2,5-di-(tert.-butylperoxy)-hexane) with respect to the final polyethylene composition. The homogenous mixture made from or containing polyethylene powder, additives, and peroxide mixture generated by the screw conveyor mixer was then fed to the feeding hopper of the ZSK NT extrusion line.

The applied operating conditions and the results of the characterizations of the pellet samples are indicated in Table 1.

Comparative Example C

The process of Comparative Example B was repeated at the same conditions except that 400 ppm by weight of the peroxide mixture (corresponding to 80 ppm by weight of 2,5-dimethyl-2,5-di-(tert.-butylperoxy)-hexane) were added with respect to the final polyethylene composition.

The applied operating conditions and the results of the characterizations of the pellet samples are indicated in Table 1.

f) pelletizing the molten polyethylene composition, and further adding a liquid comprising an organic peroxide to (i) the polyethylene powder or (ii) the mixture comprising the polyethylene powder, in an amount from 20 ppm to 200 ppm of organic peroxide with respect to the polyethylene powder, wherein the liquid is added at a position where mixing occurs and the polyethylene powder has a temperature of from 10° C. to 100° C.

2. The process of claim 1, wherein the liquid is added to (i) the polyethylene powder or (ii) the mixture, in the mixing device prior to or during step c).

3. The process of claim 1, wherein the liquid is added to the mixture in the extruder device at a position where the mixture is not yet molten, prior to step e).

4. The process of claim 1, wherein the liquid is added to the polyethylene powder by passing the liquid with an injection pressure of 0.5 to 4 MPa through a spring injector comprising a preloaded spring.

5. The process of claim 1, wherein the liquid is a peroxide solution having a content of active oxygen in the range from 0.1 wt. % to 10 wt. %, based upon the total weight of the liquid.

6. The process of claim 1, wherein the mixing of step c) is carried out in an atmosphere of reduced oxygen content and the oxygen content in the gas phase within the mixing device is less than 5 vol %.

7. The process of claim 1, wherein the mixture is introduced into the extruder device in an atmosphere of reduced oxygen content and the oxygen content in a hopper is less than 5 vol %.

TABLE 1

| | Example 2 | Example 3 | Example 4 | Comparative Example B | Comparative Example C |
|---|---|---|---|---|---|
| Peroxide [ppm by weight] | 65 | 80 | 80 | 65 | 80 |
| Production rate [kg/h] | 125 | 125 | 125 | 125 | 125 |
| ZSK 50 screw speed [rpm] | 220 | 220 | 220 | 220 | 220 |
| ZSK 50 specific energy [kWh/t] | 225 | 225 | 222 | 225 | 225 |
| ZSK 58 screw speed [rpm] | 85 | 85 | 85 | 85 | 85 |
| ZSK 58 specific energy [kWh/t] | 89 | 88 | 92 | 90 | 91 |
| MFR$_5$ [g/10 min] | 0.19 | 0.19 | 0.19 | 0.19 | 0.20 |
| Gel >700 μm [1/m$^2$] | 39 | 39 | 27 | 112 | 145 |
| Gel area [ppm] | 470 | 486 | 341 | 597 | 778 |
| SAG value | 16.5 | 14.2 | 15.8 | 21.8 | 17.4 |

The invention claimed is:

1. A process for preparing a polyethylene composition comprising bimodal or multimodal polyethylene in an extruder device comprising the steps of
  a) supplying a bimodal or multimodal polyethylene having a density determined according to DIN EN ISO 1183-1:2004 at 23° C. from 0.940 g/cm$^3$ to 0.968 g/cm$^3$, in the form of a polyethylene powder to a mixing device;
  b) supplying an additive, which is not an organic peroxide, to the mixing device;
  c) mixing the polyethylene powder and the additive at a temperature in the range from 10° C. to 100° C. without melting the polyethylene powder, thereby forming a mixture;
  d) transferring the mixture from the mixing device into the extruder device;
  e) melting and homogenizing the mixture within the extruder device, thereby forming a molten polyethylene composition; and

8. The process of claim 1, wherein the extruder device is a combination of a first and a second co-rotating twin-screw extruders, the first twin-screw extruder melt mixes the mixture and forms a molten polymer stream, the second twin-screw extruder receives the molten polymer stream from the first twin-screw extruder and completes the homogenization process.

9. The process of claim 1, wherein the extruder device is a counter-rotating continuous mixer equipped with gear pump or a co-rotating twin screw extruder equipped with gear pump.

10. The process of claim 1, wherein the specific energy applied per amount of material being processed in step e) is from 120 kWh/t to 350 kWh/t.

11. The process of claim 1, wherein the molten polyethylene composition is passed through a melt filter before being pelletized.

12. The process of claim 1, wherein the bimodal or multimodal polyethylene has a $M_w/M_n$ from 15 to 40 measured by GPC (Gel Permeation Chromatography).

13. The process of claim 1, wherein the polymerization for preparing the bimodal or multimodal polyethylene is carried out in the presence of a polymerization catalyst which is a Ziegler- or Ziegler-Natta-catalyst comprising a reaction product of an aluminum alkyl with a titanium compound supported on a magnesium halide.

14. A process for preparing a pipe comprising the steps of a) preparing a polyethylene composition according to claim 1; and b) forming the polyethylene composition into a pipe.

15. The process of claim 11, wherein the melt filter comprises one or more active screens having a mesh opening from 50 μm to 400 μm.

16. The process of claim 1, wherein the polyethylene composition comprises bimodal or multimodal polyethylenes which are prepared in a gas-phase polymerization reactor.

17. The process of claim 16, wherein the bimodal or multimodal polyethylenes are prepared in a multi-zone circulating gas-phase polymerization reactor.

18. The process of claim 16, wherein the polymerization in the gas-phase polymerization reactor is carried out in a condensing or super-condensing mode.

19. The process of claim 17, wherein the multi-zone circulating gas-phase polymerization reactor is part of a series of polymerization reactors.

* * * * *